United States Patent
Bivens et al.

(10) Patent No.: US 9,602,653 B2
(45) Date of Patent: Mar. 21, 2017

(54) COGNITIVE ALERT CONTROL FRAMEWORK FOR MOBILE DEVICES

(71) Applicant: International Business Machines Corporation, Armonk, NY (US)

(72) Inventors: John A. Bivens, Ossining, NY (US); Minkyong Kim, Scarsdale, NY (US); Min Li, San Jose, CA (US); Clifford A. Pickover, Yorktown Heights, NY (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 20 days.

(21) Appl. No.: 14/744,564

(22) Filed: Jun. 19, 2015

(65) Prior Publication Data
US 2016/0373573 A1    Dec. 22, 2016

(51) Int. Cl.
| H04B 1/38 | (2015.01) |
| H04M 1/00 | (2006.01) |
| H04M 3/02 | (2006.01) |

(52) U.S. Cl.
CPC ...................... *H04M 3/02* (2013.01)

(58) Field of Classification Search
CPC ....................................................... H04M 3/02
See application file for complete search history.

(56) References Cited

U.S. PATENT DOCUMENTS

| 6,419,629 B1 | 7/2002 | Balkin et al. |
| 7,729,487 B2 | 6/2010 | Koch |
| 7,996,046 B2 | 8/2011 | Vargas et al. |

(Continued)

FOREIGN PATENT DOCUMENTS

| CN | 103618823 A | 3/2014 |
| WO | 2008107904 A1 | 9/2008 |

(Continued)

OTHER PUBLICATIONS

Henry, "Five Best Sleep Tracking Gadgets or Apps," lifehacker,Mar. 31, 2013, p. 1-5, http://lifehacker.com/5993005/five-best-sleep-tracking-gadgets-or-apps?tag=hive-five#, Accessed on Apr. 22, 2015.

(Continued)

*Primary Examiner* — Nguyen Vo
(74) *Attorney, Agent, or Firm* — Robert C. Bunker

(57) ABSTRACT

A method for providing a cognitive alert control framework for a mobile device, wherein the mobile device includes an alert mechanism is provided. The method may include detecting, by a processor, a call being initiated by a caller using a first mobile device to a recipient using a second mobile device. The method may also include determining a cognitive state of the caller. The method may further include determining a cognitive state of the recipient. The method may include analyzing a relationship between the caller and the recipient based on the determined cognitive state of the caller and the determined cognitive state of the recipient. The method may also include determining a level of alert associated with second mobile device based on the analyzed relationship. The method may include invoking a ringtone characteristic on the second mobile device based on the determined level of alert.

20 Claims, 5 Drawing Sheets

(56) References Cited

U.S. PATENT DOCUMENTS

| | | | |
|---|---|---|---|
| 8,204,201 | B2 | 6/2012 | Gonzalez et al. |
| 8,275,122 | B2 | 9/2012 | Pedersen |
| 8,417,289 | B2 | 4/2013 | Jaiswal et al. |
| 8,958,537 | B1 | 2/2015 | Saylor |
| 2002/0131565 | A1* | 9/2002 | Scheuring ............ G06Q 10/109 379/88.19 |
| 2007/0004341 | A1* | 1/2007 | Harper .................. H04M 1/575 455/67.7 |
| 2008/0152111 | A1* | 6/2008 | Mock ...................... H04M 3/02 379/142.17 |
| 2010/0105426 | A1* | 4/2010 | Jaiswal ................ H04M 1/575 455/556.1 |
| 2013/0143629 | A1 | 6/2013 | Walling, III |
| 2014/0223462 | A1 | 8/2014 | Aimone et al. |
| 2014/0253666 | A1* | 9/2014 | Ramachandran ....... H04W 4/12 348/14.06 |

FOREIGN PATENT DOCUMENTS

| | | |
|---|---|---|
| WO | 2014052334 A1 | 4/2014 |
| WO | 2014137303 A1 | 9/2014 |

OTHER PUBLICATIONS

Henry, "Sleep Time Alarm Clock for Android Watches Your Sleep Cycles, Wakes You Gently," lifehacker, Sep. 12, 2012, p. 1, http://lifehacker.com/5942519/sleep-time-alarm-clock-for-android-watches-your-sleep-cycles-wakes-you-gently, Accessed on Apr. 22, 2015.

Mell et al., "The NIST Definition of Cloud Computing," National Institute of Standards and Technology, Sep. 2011, p. 1-3, Special Publication 800-145.

* cited by examiner

COGNITIVE ALERT CONTROL FRAMEWORK FOR MOBILE DEVICES

BACKGROUND

The present invention relates generally to the field of computers, and more particularly to alert control for a mobile device.

A ringtone (i.e., ringtone) is the sound made by a mobile device, such as a smartphone device or a smart watch to indicate an incoming call or text message. Today, the ringtone associated with an electronic computing device, may not literally be a tone or an actual (bell-like) ring any more. Rather, the term 'ringtone' is most often used today to refer to customizable sounds used on mobile phones. A phone "rings" when its network indicates an incoming call, a text message, an email, etc. The phone alerts the recipient of such incoming call, message or email via the 'ringtone'. For landline telephones, the call signal can be an electric current generated by the switch or exchange to which the telephone is connected, which originally drove an electric bell. For mobile phones, the network sends the phone a message indicating an incoming call.

SUMMARY

According to one embodiment, a method for providing a cognitive alert control framework for a mobile device, wherein the mobile device includes an alert mechanism is provided. The method may include detecting, by a processor, a call being initiated by a caller using a first mobile device to a recipient using a second mobile device. The method may also include determining a cognitive state of the caller. The method may further include determining a cognitive state of the recipient. The method may include analyzing a relationship between the caller and the recipient based on the determined cognitive state of the caller and the determined cognitive state of the recipient. The method may also include determining a level of alert associated with second mobile device based on the analyzed relationship. The method may include invoking a ringtone characteristic on the second mobile device based on the determined level of alert.

According to another embodiment, a computer system for providing a cognitive alert control framework for a mobile device, wherein the mobile device includes an alert mechanism is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include detecting, by a processor, a call being initiated by a caller using a first mobile device to a recipient using a second mobile device. The method may also include determining a cognitive state of the caller. The method may further include determining a cognitive state of the recipient. The method may include analyzing a relationship between the caller and the recipient based on the determined cognitive state of the caller and the determined cognitive state of the recipient. The method may also include determining a level of alert associated with second mobile device based on the analyzed relationship. The method may include invoking a ringtone characteristic on the second mobile device based on the determined level of alert.

According to yet another embodiment, a computer program product for providing a cognitive alert control framework for a mobile device, wherein the mobile device includes an alert mechanism is provided. The computer program product may include one or more computer-readable storage devices and program instructions stored on at least one of the one or more tangible storage devices, the program instructions executable by a processor. The computer program product may include program instructions to detect, by a processor, a call being initiated by a caller using a first mobile device to a recipient using a second mobile device. The computer program product may also include program instructions to determine a cognitive state of the caller. The computer program product may further include program instructions to determine a cognitive state of the recipient. The computer program product may include program instructions to analyze a relationship between the caller and the recipient based on the determined cognitive state of the caller and the determined cognitive state of the recipient. The computer program product may also include program instructions to determine a level of alert associated with second mobile device based on the analyzed relationship. The computer program product may include program instructions to invoke a ringtone characteristic on the second mobile device based on the determined level of alert.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
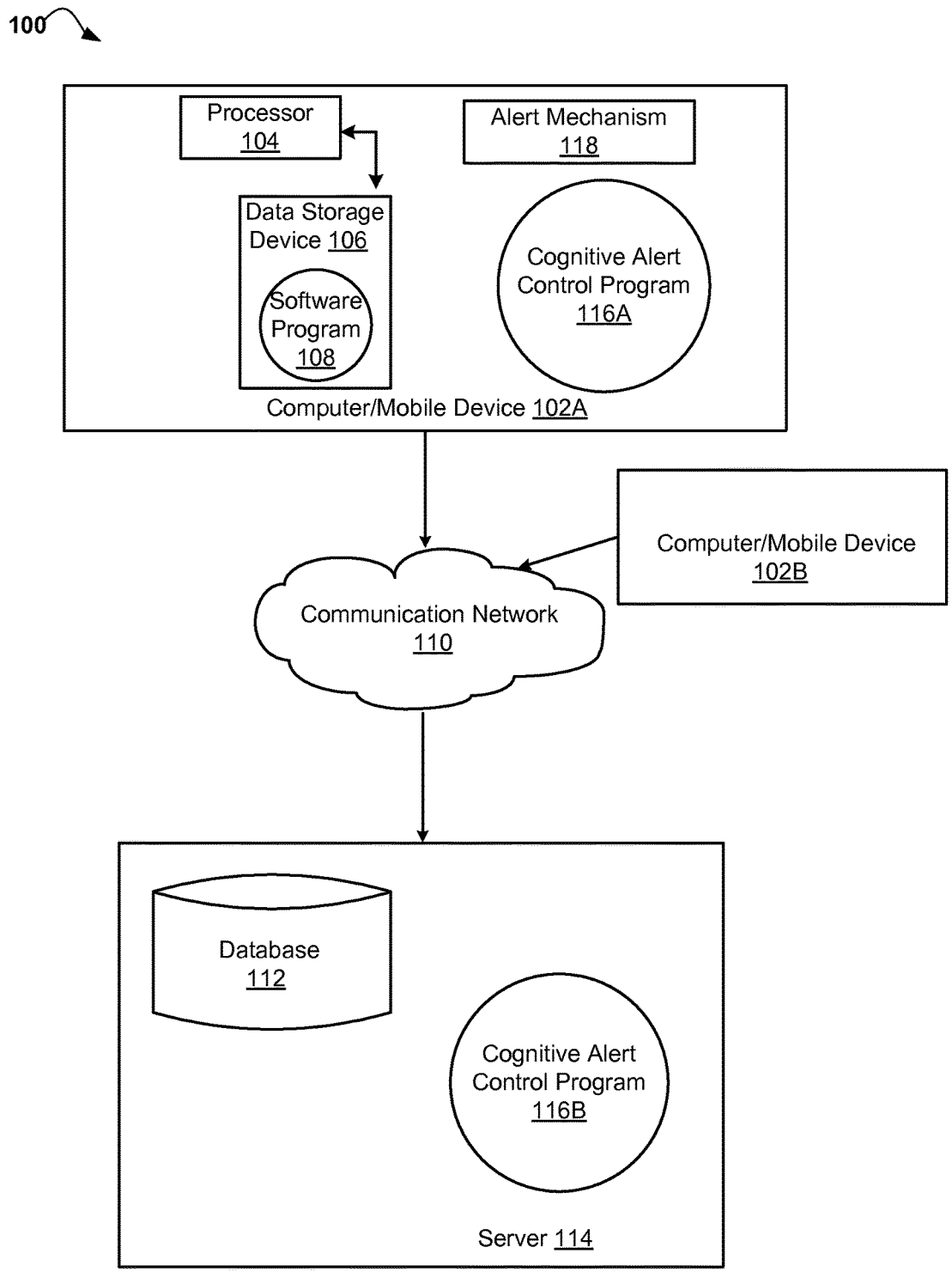
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computers, and more particularly to alert control, such as sound control for a mobile device. The following described exemplary embodiments provide a system, method and program product to, among other things, provide a cognitive alert control framework for mobile devices, such as a smartphone or a smart watch. Therefore, the present embodiment has the capacity to improve the technical field of alert control associated with a mobile device by providing a means of changing the ringtone characteristic of an alert, such as a sound associated with a mobile device. More specifically, the present embodiment may change the ringtone characteristic based on a joint analysis of the cognitive state of the caller and the call recipient.

As previously described, a ringtone is the sound made by a mobile device (i.e. a smartphone device or mobile device including a smart watch) to indicate an incoming call, email, or text message. Today, the term 'ringtone' is most often used to refer to customizable sounds or alerts used on mobile devices. However, there is no cognitive ability associated with a ringtone today even if the sound of the ringtone is customizable. For example, there is no ability to adjust a ringtone based on the cognitive state of the caller, the cognitive state of the call recipient, or based on information obtained via an application, such as a calendar application that may be running on the device. Calendar software is software that provides users with an electronic version of a calendar. Additionally, the software may provide an appointment book, address book, and/or contact list. These tools may be an extension of many of the features provided by time management software such as desk accessory packages and computer office automation systems. Currently, calendaring is a standard feature of many PDAs, EDAs, and smartphones. The software may be a local package designed for individual use or may be a networked package that allows for the sharing of information between users. As such, it may be advantageous, among other things, to provide a cognitive sound control framework for a mobile device that is based on cognitive state of the caller, the cognitive state of the call recipient or based on information obtained via software associated with the mobile device, such as a calendar application that may be running on the mobile device.

According to at least one implementation, the present embodiment provides a means of changing a ringtone characteristic associated with a mobile device, such as a smartphone or a smart watch based on a joint analysis of the cognitive state of the caller and the call recipient in addition to analyzing information obtained from software associated with the mobile device, such as a calendar application that may be running on the mobile device. Therefore, the present embodiment may change a ringtone or an alert characteristic (e.g., sound characteristic) for a mobile device, such as a smart phone or a smart watch based on the joint analysis of a cognitive state of a caller or a recipient, whereby the cognitive state includes a sleep pattern, a call importance, a person's mood, an emotional state, and a current meeting importance (if it is determined that the recipient is in a meeting).

More specifically, the cognitive state of the call recipient, with a confidence level (C), may include many considerations such as sleep cycle, bed time, or current meeting importance (e.g. as gleaned from an electronic calendar that aides in determining if a user is in a meeting). The cognitive state of the call recipient may also include an assessment of a sequence of meetings during a day to assess if a user is fatigued, for example. Additionally, the ringtone characteristic (e.g., volume or vibration pattern for the mobile device) may be changed depending on the social network distance of the caller from the recipient in accordance with the recipient's social network. Furthermore, the caller and the recipient may include groups of people. Also, the ringtone characteristic may be changed based on a learning mechanism that utilizes the recipient's feedback on importance of a call in addition to the computation of the social distance metric between the caller and the recipient. Additionally, the present embodiment may offer a recommendation to a user that may assist the user with deciding whether to adjust the sound or alert level (i.e., "ringtone").

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product that provides a cognitive alert control framework for mobile devices, such as a smartphone or a smart watch that has alert capability (i.e., the mobile device has an alert mechanism that enables an audio or visual alert). According to at least one implementation, the present embodiment may provide a means of changing the ringtone characteristic based on a joint analysis of the cognitive state of the caller and call recipient. As such, the ringtone characteristic may take many forms such as: sound characteristic, volume, vibration pattern, visual alert, or a number of times sounded before being sent to voicemail. Additionally, a threshold (as predetermined by the user or the present embodiment) may be used for determining whether to suppress (e.g. mute) or allow the ringtone.

Referring to FIG. 1, an exemplary networked computer environment 100 in accordance with one embodiment is depicted. The networked computer environment 100 may include a computer (i.e., computer/mobile device) 102A, 102B with an alert mechanism 118, a processor 104 and a data storage device 106 that is enabled to run a software program 108 and a Cognitive Alert Control Program 116A. The networked computer environment 100 may also include a server 114 that is enabled to run a Cognitive Alert Control Program 116B that may interact with a database 112 and a communication network 110. The networked computer environment 100 may include a plurality of computers 102A, 102B and servers 114, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computers 102A, 102B may communicate with the Cognitive Alert Control Program 116B running on server computer 114 via the communications network 110. The communications network 110 may include connections, such as wire, wireless communication links, or fiber optic cables. As will be discussed with reference to FIG. 3, server computer 114 may include internal components 800a and external components 900a, respectively, and client computers 102A, 102B may include internal components 800b and external components 900b, respectively. Server computer 114 may also operate in a cloud computing service model, such as Software as a Service (SaaS), Platform as a Service (PaaS), or Infrastructure as a Service (IaaS). Server 114 may also be located in a cloud computing deployment model, such as a private cloud, community cloud, public cloud, or hybrid cloud. Client computers 102A, 102B may be, for example, a mobile device, a telephone, a personal digital assistant, a netbook, a laptop computer, a tablet computer, a desktop computer, or any type of computing devices capable of running a program, accessing a network, and accessing a database 112. According to various implementations of the present embodiment, the Cognitive Alert Control Program 116A, 116B may interact with a database 112 that may be embedded in various storage devices, such as, but not limited to a computer/mobile device 102A, 102B, a networked server 114, or a cloud storage service.

As previously described, the client computers/mobile devices 102A, 102B may access the Cognitive Alert Control Program 116B, running on server computer 114 via the communications network 110. For example the Cognitive Alert Control Program 116A, 116B running on a mobile device/client computer 102A, 102B may be utilized to provide a means of changing the ringtone characteristic based on a joint analysis of the cognitive state of the caller using a first mobile device, such as mobile device 102A and the cognitive state of a recipient using a second mobile device, such as mobile device 102B, The Cognitive Alert Control Program 116A, 116B also includes the analysis of information obtained via software associated with the mobile devices 102A, 102B, such as a calendar software running on the mobile devices 102A, 102B. The Cognitive Alert Control method is explained in more detail below with respect to FIG. 2.

Figure 2:
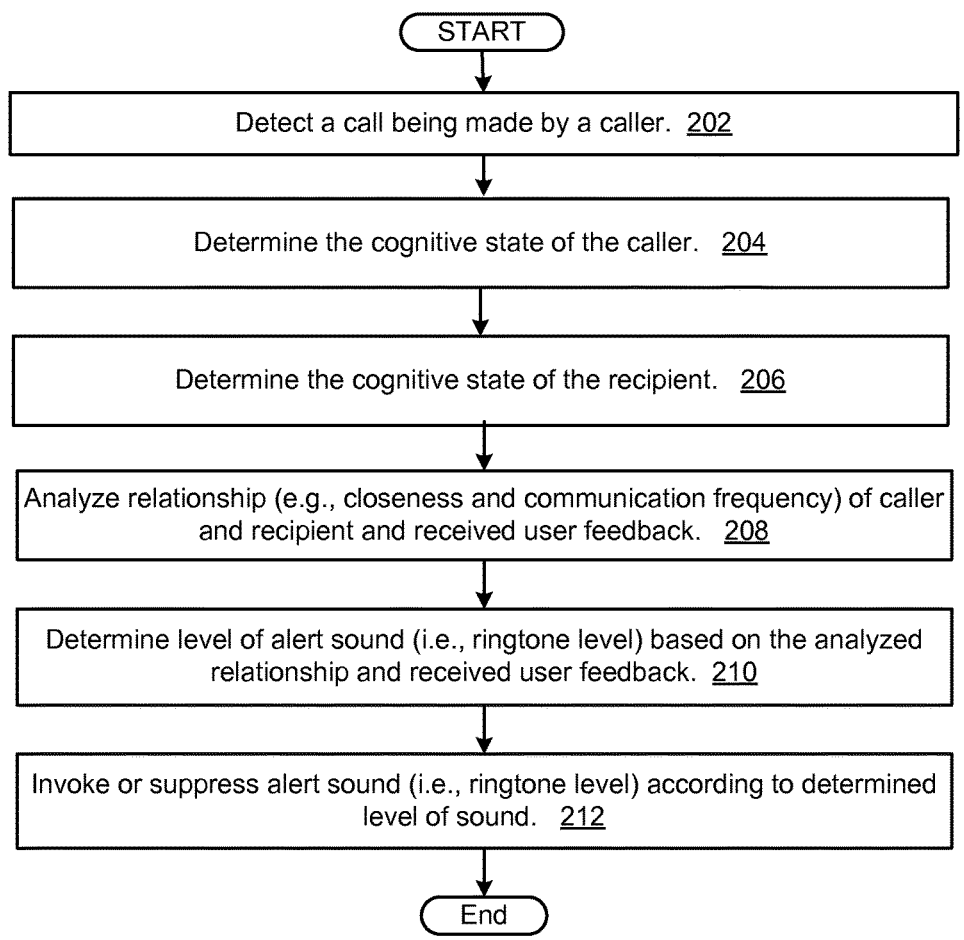
FIG. 2 is an operational flowchart illustrating the steps carried out by a program that provides a cognitive sound framework for a mobile device according to at least one embodiment.

Referring now to FIG. 2, an operational flowchart 200 illustrating the steps carried out by a program that provides a cognitive alert framework for a mobile device in accordance with one embodiment is depicted. As previously described, the Cognitive Alert Control Program 116A, 116B (FIG. 1) may provide a means of changing a ringtone characteristic (i.e., an alert or a sound) of a mobile device 102A, 102B (FIG. 1), such as a smartphone or a smart watch, that is enabled with an alert mechanism 118 (FIG. 1) based on a joint analysis of the caller and the call recipient in addition to an analysis of a software application associated with the mobile device 102A, 102B (FIG. 1), such as a calendaring software. The ringtone characteristic includes, but is not limited, to characteristics associated with the ringtone of the mobile device 102A, 102B (FIG. 1), such as a sound characteristic, a volume, a vibration pattern, a visual alert, a number of times an alert sound is sounded before being sent to a voicemail, as well as a threshold for determining whether to suppress (e.g., mute) or allow the alert sound to be triggered.

At 202, a call (including a text message and an email) being made by a caller is detected. As such, the Cognitive Alert Control Program 116A, 116B (FIG. 1) detects that a caller using a mobile device 102A (FIG. 1), such as a smartphone or smart watch has initiated a call to a recipient also using a mobile device 102B (FIG. 1), such as a smartphone or smart watch.

Then at 204, the cognitive state of the caller is determined. As such, the cognitive state of the caller may be determined according to a pre-determined threshold (pre-determined by the user or the present embodiment), such as a confidence level C. The confidence level C may include information, such as the emotional state of caller or the importance of call. According to at least one implementation, the metrics used to determine the confidence level C may be derivatives of previous communication between the caller and the call recipient. For example, the average stress level may be measured in previous calls with the caller. Additionally, the caller emotion may be optionally gleaned by a biometric, a pressure level on phone buttons, etc. The volume of the ringtone can be increased if the caller is sensed to be angry or becomes impatient.

Next at 206, the cognitive state of the recipient is determined. According to at least one implementation, the cognitive state of the call recipient, with confidence level C, may include, but is not limited to considerations such as sleep cycle, bed time, current meeting importance (e.g. as gleaned from an electronic calendar) if the recipient is in a meeting, current call importance (e.g. cases where call waiting is used with caller ID), or physical location of the recipient. It may also include an assessment of a sequence of meetings during a day (e.g. to assess user fatigue) or an assessment of the recipient's stress or health (e.g. using devices that can measure a user's pulse, etc.). Additionally, the method may deduce such information, in part, by determining the physical location of the call recipient and by learning the needs of the user in such locations. Furthermore, a sleep cycle (of the recipient) may be estimated through motion analysis of a sleeper (e.g. video or accelerometers). Optionally, the sleep cycle can also be estimated through a light sensor on the mobile device 102A, 102B (FIG. 1). For example, if the room where the recipient is sleeping tends to be dark (as previously determined when the recipient is sleeping) and the phone is in the same room, then the present embodiment may determine under such circumstances that the recipient is currently sleeping.

Then at 208, the relationship, including the closeness and communication frequency, of the caller and the recipient is analyzed in addition to any received user feedback regarding the relationship. According to at least one implementation, the importance of the call (including the relationship between the caller and the recipient) may be optionally estimated and be determined by the number of times the caller tries to call the recipient in a short period of time (e.g. within two minutes to half an hour). As such, the volume of the ringtone may be increased (e.g. for a known caller) if the call is made for the second time onwards and if the status of recipient (i.e., the previously determined cognitive state of the recipient in step 206) allows the ringtone to be increased. For example, if the recipient had previously been determined to not be sleeping, driving, or attending an important meeting.

Additionally, according to at least one implementation, the meeting importance (if it is determined that the call recipient is in a meeting) may be determined by topic extraction and the nature of the attendees in an entry retrieved from an electronic calendar associated with the call recipient and possibly running on the mobile device 102A, 102B (FIG. 1). The topic extraction may be performed by using existing technology methods, such as natural language processing or latent semantic indexing. The nature of attendees includes the job roles of the attendees. For example, if there is a vice president, or members of a management chain present at the meeting, then the meeting may be viewed as important. Additionally, a meeting is important if it is marked as important in the calendar or it is determined to be related to the call recipient's main projects. Optionally, the physical location of the call recipient may be determined by GPS or a wifi signal location system. Furthermore, the importance of the call to the call recipient can also be manually indicated by the caller. However, by default, the importance of the call is regular (i.e., no urgency indicated).

Collaboration graphs may be considered to aide in the determination of the relationship and closeness of the recipient to the caller. Such a graph models a social network where the vertices represent participants of that network (usually individual people) and where two distinct participants are joined by an edge whenever there is a collaborative relationship between them of a particular kind. Collaboration graphs are used to measure the closeness of collaborative relationships between the participants of the network. According to the present embodiment, callers and recipients may be groups of people (e.g., a husband/wife or a group of colleagues in a meeting), and may not be restricted to individuals. As such, the distance between two people or nodes in a collaboration graph (i.e., the "collaboration distance") may be used. The collaboration distance between two distinct nodes is equal to the smallest number of edges in an edge-path connecting them. Therefore, if no path exists that connects caller A and caller B, the collaboration distance between caller A and caller B is said to be infinite.

Next at 210, the level of the alert sound (i.e., the ringtone level) is determined based on the previously analyzed relationship and any previously received user feedback. Additionally, the ringtone can be suppressed or allowed based on the physical GPS location of recipient (and by the present embodiment learning the needs of a user in such locations). For example, if the recipient is currently driving, the ringtone may be suppressed (by learning the needs of a user in such locations) to keep the driver safe.

Additionally, the present embodiment may learn when and how to change one or more ringtone characteristics due to user feedback. For example, the present embodiment may learn that a user always not answering a call when the user is in a meeting with a particular person or discussing a particular topic (as gleaned from an electronic calendar) means that the user does not want to be disturbed under such circumstances.

Furthermore, the ringtone characteristic may depend on the current health or stress of the recipient and, in addition, may also depend on the projected impact the caller would have on the recipient's current health. For example, the higher the recipient's stress level, the less alarming the ringtone should be. Additionally, if the recipient's stress level plus the average increase recorded for the caller's previous communication with the recipient exceeds a predefined threshold, the call may be suppressed. Conversely, if the recipient's stress level is high, and the average caller's previous communication reduces the recipient's stress level, the invoked ringtone may be louder. A profile or database 112 (FIG. 1) may be used to store preferences and/or associated mappings.

Also, the ringtone characteristic may depend on the distance of the caller from the recipient in a hierarchical management chain. For example, the higher up the caller, the more invasive the ring. Additionally, as previously explained, the ringtone characteristic may depend on the distance of the caller from the recipient in the recipient's social network. According to various implementations, the present embodiment may consider adjacencies, such as the direct connections from a caller and a recipient of the call.

Then at 212, the alert sound (i.e., ringtone level) is invoked or suppressed based on the level of sound determined in the previous steps 202-210.

It may be appreciated that FIG. 2 provides only an illustration of one implementation and does not imply any limitations with regard to how different embodiments may be implemented. Many modifications to the depicted environments may be made based on design and implementation requirements. As previously mentioned, the ringtone characteristic may depend on the frequency of communication between the caller and recipient (e.g. whether the two parties speak several times a month or several times a year) and the caller can be made aware of the recipient's cognitive state (e.g. the recipient is likely sleeping) by color, sound, message, etc.

Additionally, the present embodiment may send a message to the caller informing the caller of status of recipients, such as whether the recipient is sleeping, driving, in a meeting, busy, etc. For example, in one scenario, this may be useful to inform worried parents about the travelling status of their children if their children cannot pick up the phone because the child is driving or a person cannot use their cellphone because they are travelling in an airplane.

The system by default may automatically group the calls into high priority phone calls and low priority phone calls without a user's intervention. Thus, recipients can easily distinguish important calls from unimportant ones. The importance of phone calls for recipients depends on a computation of a social distance metric between the caller and recipients. It may also be learned from users' feedback.

The present embodiment may utilize existing technology for enabling sleep cycle determination for the potential recipient of a call and may perform an on-the-fly estimate of a user's sleep state by utilizing an existing method for estimating a sleep state. For example, one current method may be a sleep application that is installed on the mobile device 102A, 102B (FIG. 1) and monitors a user's movement by using a phone's accelerometer to detect a user's movement over the course of the night. It then charts that movement to determine which phase of the user's sleep cycle they are in and at what time of night.

Significantly, the current or forecast cognitive state of the sleeper (e.g. person in bed who may be the recipient of the phone call) may be based on US Army Patent "Method for predicting human cognitive performance" U.S. Pat. No. 6,419,629 B1, an apparatus and method for predicting cognitive performance of an individual based on factors including sleep history and the time of day. The method facilitates the creation of predicted cognitive performance curves that allow an individual to set his/her sleep times to produce higher levels of cognitive performance. The method also facilitates the reconstruction of past cognitive performance levels based on sleep history.

The current or forecast cognitive state of the sleeper (recipient of call) may also be based on assessment of other occupants in a room or bed, real-time assessment that considers clenching of teeth, snoring, state of user (and medications), and a multidimensional vector of cognitive states of the primary user and other users (e.g. spouse). Additionally, sleep deprivation may be considered since it may impair alertness, cognitive performance, and mood.

According to an alternate implementation, a video ringtone may be employed. A method for sending a video ringtone may include sending a call from a first communication device 102A (FIG. 1) to a second communication device 102B (FIG. 1), whereby the call communicates a selectable video as a ringtone at the second communication device (based on WO 2014052334 A1).

Optionally, a notification charm for a wireless communication device can be employed, and the present embodiment may be used to operate the wireless device to provide an alert on the charm. The charm may be a bracelet, watch, keychain, ring, or other ornamental device which can generate an event and preference based alerts about events occurring on a wireless device 102A, 102B (FIG. 1) (based on U.S. Pat. No. 7,996,046 B2).

Additionally, many of the embodiments described herein may apply to alert communication methods of other kinds (e.g. "new email alerts" or a visual alert), however, ringtones have been used for example purposes only. Furthermore, the present embodiment may be offered "as a service in the cloud" (i.e., Software as a Service (SaaS)) for applications running on mobile devices 102A, 102B (FIG. 1) and these mobile devices 102A, 102B (FIG. 1) may adjust their sound level ("ringtone") based on the recommendation that the present embodiment provides.

Furthermore, the "cognitive state of the caller" can be encoded along with the signal/message to the recipient. As such, in the case of the telephone, the "state" can be encoded using the sound signal (Hz). For example, the present embodiment may utilize an AUTOVON network which differentiates ringtones to denote priority and preemption. Priority audible ring (AUTOVON): The priority audible ring tone replaces normal audible ring for priority calls within the AUTOVON network. Priority audible ring is 440 Hz and 480 Hz at −16 dBm0/frequency on for 1.65 seconds and off for 0.35 seconds. Preemption tone (AUTOVON): The preemption tone is provided to both parties of a connection that a priority call from the AUTOVON network preempts. Preemption tone is 440 Hz and 620 Hz at −18 dBm0/frequency steady for anywhere from three to fifteen seconds.

Figure 3:
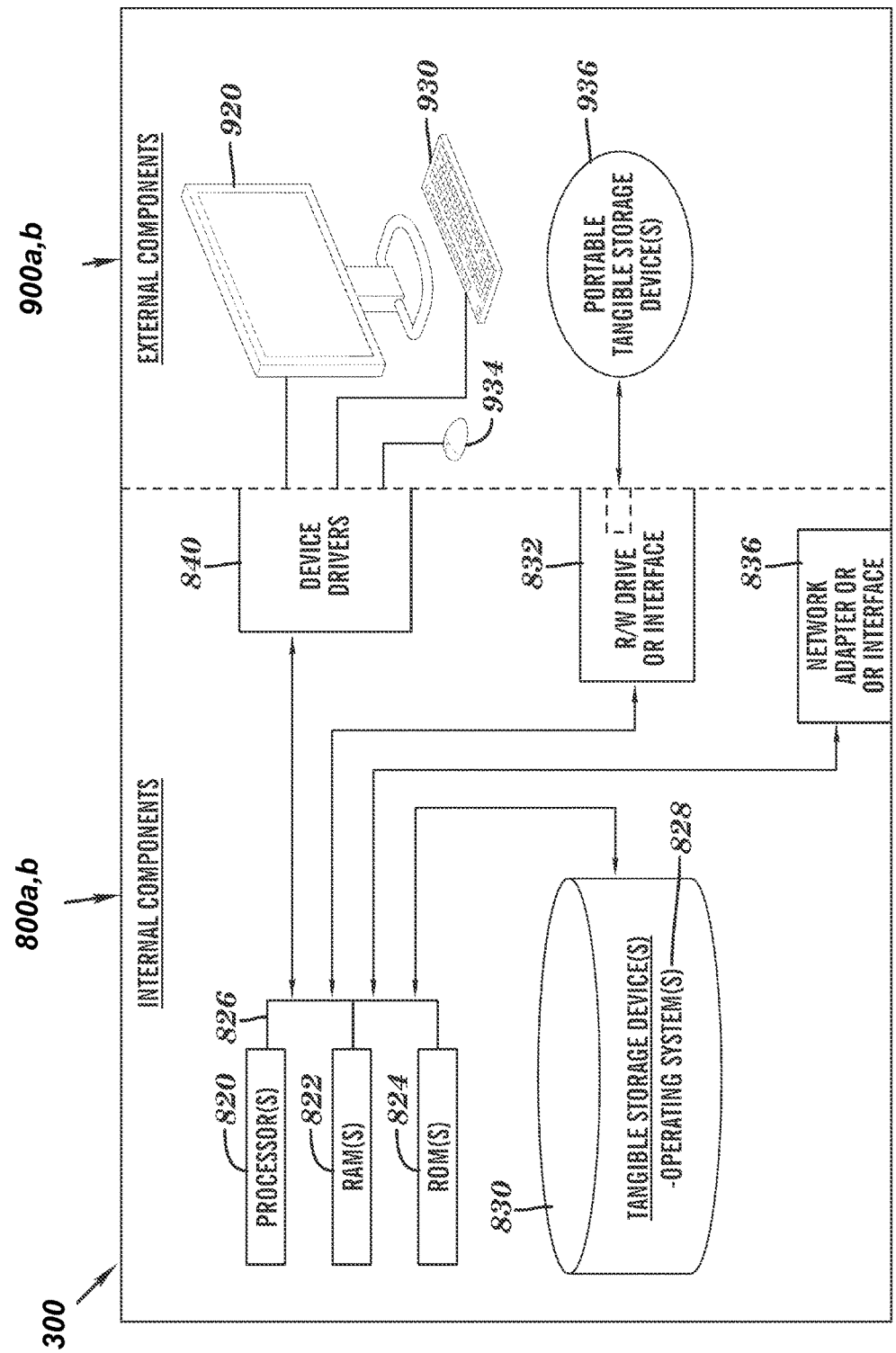
FIG. 3 is a block diagram of internal and external components of computers and servers depicted in FIG. 1 according to at least one embodiment.

FIG. 3 is a block diagram 300 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102A, 102B (FIG. 1) and network server 114 (FIG. 1) may include respective sets of internal components 800 *a,b* and external components 900 *a,b* illustrated in FIG. 3. Each of the sets of internal components 800 include one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and the Software Program 108 (FIG. 1) and the Cognitive Alert Control Program 116A (FIG. 1) in client computer 102A, 102B (FIG. 1) and the Cognitive Alert Control Program 116B (FIG. 1) in network server 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 *a,b* also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the Software Program 108 (FIG. 1) and the Cognitive Alert Control Program 116A, 116B (FIG. 1) can be stored on one or more of the respective portable computer-readable tangible storage devices 936, read via the respective R/W drive or interface 832 and loaded into the respective hard drive 830.

Each set of internal components 800 *a,b* also includes network adapters or interfaces 836 such as a TCP/IP adapter cards, wireless Wi-Fi interface cards, or 3G or 4G wireless interface cards or other wired or wireless communication links. The Software Program 108 (FIG. 1) and the Cognitive Alert Control Program 116A (FIG. 1) in client computer 102A, 102B (FIG. 1) and the Cognitive Alert Control Program 116B (FIG. 1) in network server 114 (FIG. 1) can be downloaded to client computer 102A, 102B (FIG. 1) and network server 114 (FIG. 1) from an external computer via a network (for example, the Internet, a local area network or other, wide area network) and respective network adapters or interfaces 836. From the network adapters or interfaces 836, the Software Program 108 (FIG. 1) and the Cognitive Alert Control Program 116A (FIG. 1) in client computer 102A, 102B (FIG. 1) and the Cognitive Alert Control Program 116B (FIG. 1) in network server 114 (FIG. 1) are loaded into the respective hard drive 830. The network may comprise copper wires, optical fibers, wireless transmission, routers, firewalls, switches, gateway computers and/or edge servers.

Each of the sets of external components 900 *a,b* can include a computer display monitor 920, a keyboard 930, and a computer mouse 934. External components 900 *a,b* can also include touch screens, virtual keyboards, touch pads, pointing devices, and other human interface devices. Each of the sets of internal components 800 *a,b* also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
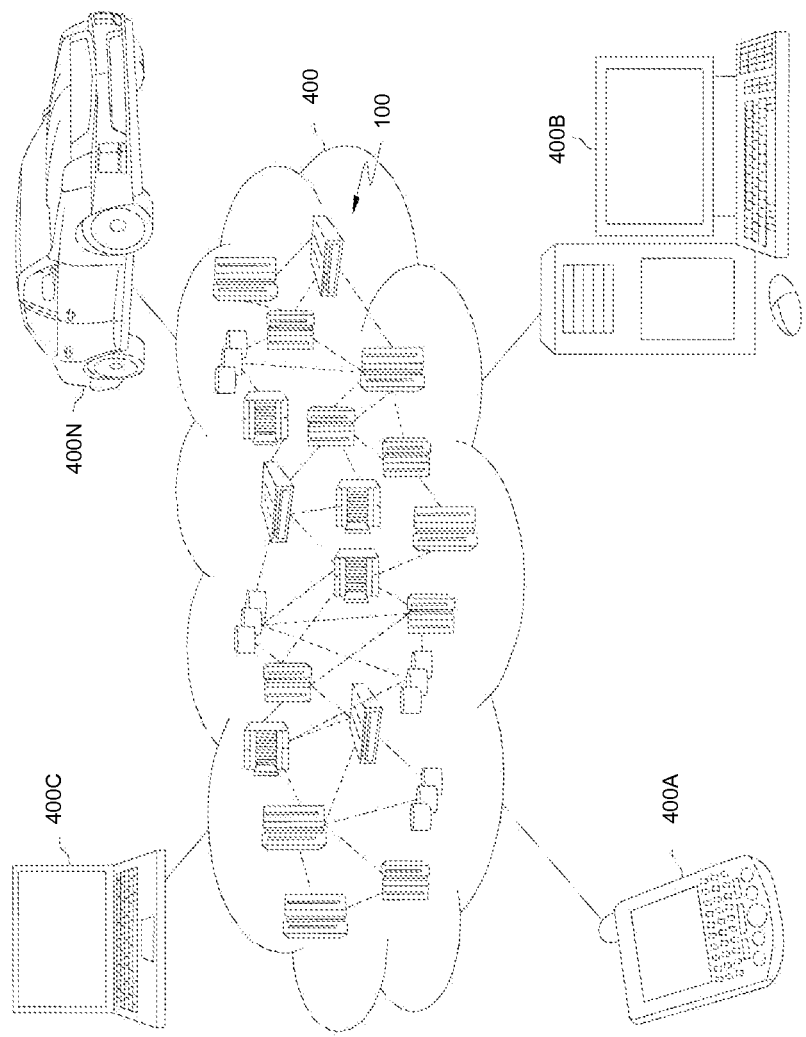
FIG. 4 is a block diagram of an illustrative cloud computing environment including the computer system depicted in FIG. 1, according to at least one embodiment.

Referring now to FIG. 4, illustrative cloud computing environment 400 is depicted. As shown, cloud computing environment 400 comprises one or more cloud computing nodes 100 with which local computing devices used by cloud consumers, such as, for example, personal digital assistant (PDA) or cellular telephone 400A, desktop computer 400B, laptop computer 400C, and/or automobile computer system 400N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 400A-N shown in FIG. 4 are intended to be illustrative only and that computing nodes 100 and cloud computing environment 400 can communicate with any type of computerized device over any type of network and/or network addressable connection (e.g., using a web browser).

Figure 5:
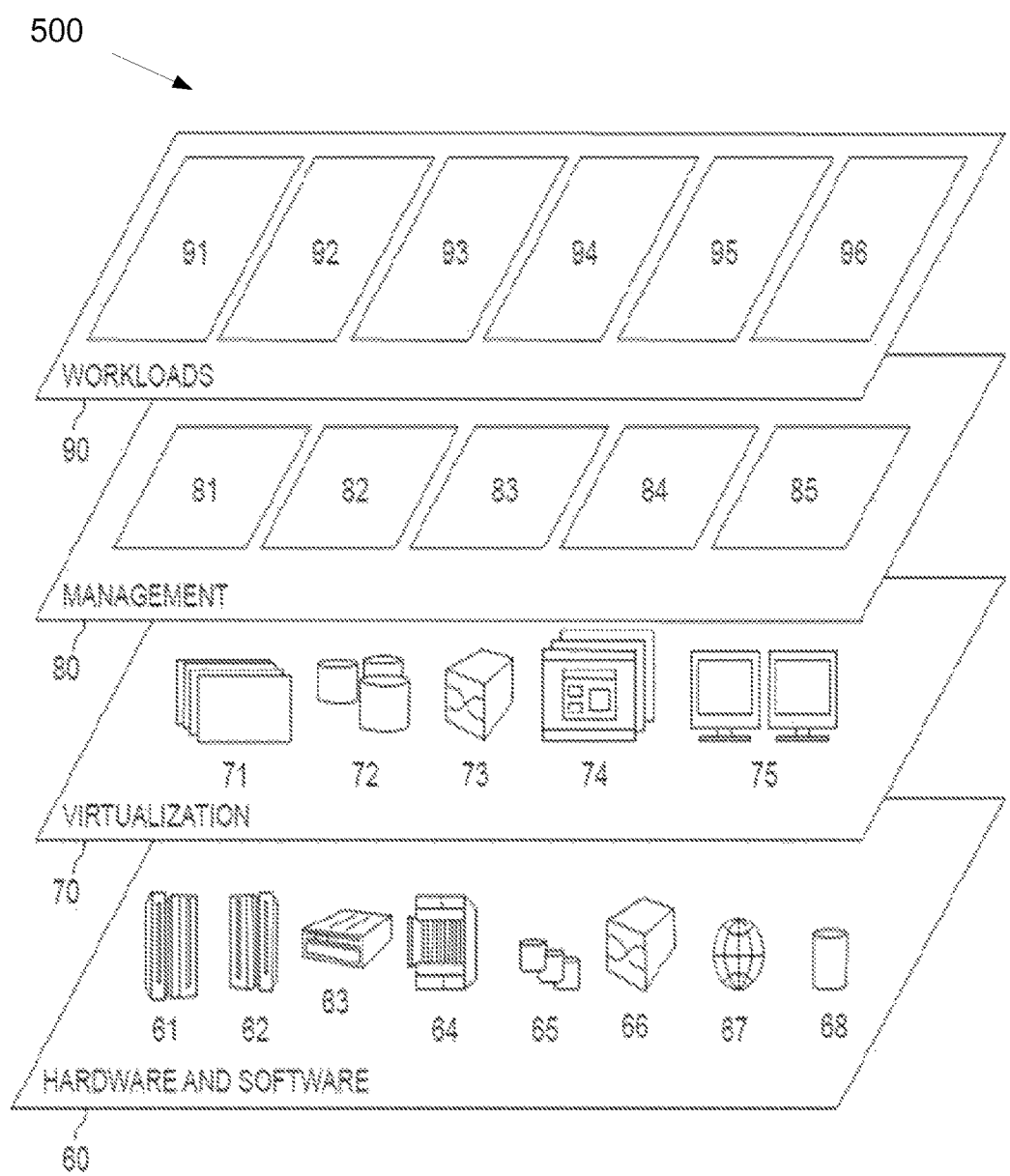
FIG. 5 is a block diagram of functional layers of the illustrative cloud computing environment of FIG. 4, according to at least one embodiment.

Referring now to FIG. 5, a set of functional abstraction layers 500 provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Cognitive Alert Control 96. A Cognitive Alert Control Program 116A, 116B (FIG. 1) may be offered "as a service in the cloud" (i.e., Software as a Service (SaaS)) for applications running on mobile devices 102A, 102B (FIG. 1) and may provide a cognitive alert control framework for mobile devices that have ringtone, audio, or visual alert capability, such as a smartphone or a smart watch.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for providing a cognitive alert control framework for a mobile device, wherein the mobile device includes an alert mechanism, the method comprising:

detecting, by a processor, a call being initiated by a caller using a first mobile device to a recipient using a second mobile device;

determining a cognitive state of the caller;

determining a cognitive state of the recipient;

analyzing a relationship between the caller and the recipient based on the determined cognitive state of the caller and the determined cognitive state of the recipient;

determining a plurality of recipient feedback that is associated with the cognitive state of the recipient to identify an importance of the initiated call to the recipient, wherein the plurality of recipient feedback is based on a plurality of detected reactions by the recipient to the initiated call and a history of recipient reactions to a history of initiated calls associated with the caller;

determining a level of alert for a ringtone characteristic associated with second mobile device based on the analyzed relationship and the plurality of recipient feedback, wherein determining the level of alert of the ringtone characteristic is selected from a group consisting of determining to increase the ringtone characteristic, determining to decrease the ringtone characteristic, determining to mute the ringtone characteristic, or determining to allow a ringtone characteristic;

invoking the ringtone characteristic on the second mobile device based on the determined level of alert; and learning when and how to change the level of alert for the ringtone characteristic based on the plurality of recipient feedback.

2. The method of claim 1, wherein the ringtone characteristic comprises at least one of a sound characteristic, a volume, a vibration pattern, a visual alert, a number of times an alert is sounded before a voicemail application is invoked, and a threshold for determining whether to suppress the ringtone characteristic or allow the ringtone characteristic.

3. The method of claim 1, wherein the cognitive state of the recipient is determined by analyzing at least one of a sleep cycle associated with the recipient, a bed time associated with the recipient, a current meeting importance associated with the recipient, an assessment of a sequence of meetings during a day for the recipient, and a physical location of the recipient.

4. The method of claim 1, wherein the cognitive state of the caller is determined by at least one of a biometric associated with the caller, an emotional state of the caller, and an importance of a call.

5. The method of claim 1, wherein determining the cognitive state of the recipient further comprises:

determining a meeting importance associated with the recipient;

determining an importance estimation of the detected initiated call;

estimating a sleep cycle associated with the recipient; and informing the caller of the determined cognitive state of the recipient based on the determined meeting importance, the determined importance estimation of the detected initiated call, or the estimated sleep cycle.

6. The method of claim 5, wherein the meeting importance is determined using topic extraction and determining the nature of a plurality of attendees in an entry in an electronic calendar associated with the second mobile device.

7. The method of claim 5, wherein the importance estimation of the initiated call is determined based on at least one of analyzing a frequency of a plurality of calls made within a predetermined period of time, by receiving an indication explicitly made by the caller to manually mark the detected initiated call as important, by receiving a plurality of user feedback, and by determining a computation of a social distance metric between the caller and the recipient.

8. The method of claim 5, wherein the estimated sleep cycle is determined through a motion analysis of the recipient.

9. The method of claim 1, wherein the ringtone characteristic depends on a determined distance of the caller from the recipient in the recipient's social network and a determined frequency of communication between the caller and the recipient.

10. A computer system for providing a cognitive alert control framework for a mobile device, wherein the mobile device includes an alert mechanism, the computer system comprising:

one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:

detecting, by a processor, a call being initiated by a caller using a first mobile device to a recipient using a second mobile device;

determining a cognitive state of the caller;

determining a cognitive state of the recipient;

analyzing a relationship between the caller and the recipient based on the determined cognitive state of the caller and the determined cognitive state of the recipient;

determining a plurality of recipient feedback that is associated with the cognitive state of the recipient to identify an importance of the initiated call to the recipient, wherein the plurality of recipient feedback is based on a plurality of detected reactions by the recipient to the initiated call and a history of recipient reactions to a history of initiated calls associated with the caller;

determining a level of alert for a ringtone characteristic associated with second mobile device based on the analyzed relationship and the plurality of recipient feedback, wherein determining the level of alert of the ringtone characteristic is selected from a group consisting of determining to increase the ringtone characteristic, determining to decrease the ringtone characteristic, determining to mute the ringtone characteristic, or determining to allow a ringtone characteristic;

invoking the ringtone characteristic on the second mobile device based on the determined level of alert; and learning when and how to change the level of alert for the ringtone characteristic based on the plurality of recipient feedback.

11. The computer system of claim 10, wherein the ringtone characteristic comprises at least one of a sound characteristic, a volume, a vibration pattern, a visual alert, a number of times an alert is sounded before a voicemail application is invoked, and a threshold for determining whether to suppress the ringtone characteristic or allow the ringtone characteristic.

12. The computer system of claim 10, wherein the cognitive state of the recipient is determined by analyzing at least one of a sleep cycle associated with the recipient, a bed time associated with the recipient, a current meeting importance associated with the recipient, an assessment of a sequence of meetings during a day for the recipient, and a physical location of the recipient.

13. The computer system of claim 10, wherein the cognitive state of the caller is determined by at least one of a biometric associated with the caller, an emotional state of the caller, and an importance of a call.

14. The computer system of claim 10, wherein determining the cognitive state of the recipient further comprises:

determining a meeting importance associated with the recipient;

determining an importance estimation of the detected initiated call;

estimating a sleep cycle associated with the recipient; and informing the caller of the determined cognitive state of the recipient based on the determined meeting importance, the determined importance estimation of the detected initiated call, or the estimated sleep cycle.

15. The computer system of claim 14, wherein the meeting importance is determined using topic extraction and determining the nature of a plurality of attendees in an entry in an electronic calendar associated with the second mobile device.

16. The computer system of claim 14, wherein the importance estimation of the initiated call is determined based on at least one of analyzing a frequency of a plurality of calls made within a predetermined period of time, by receiving an indication explicitly made by the caller to manually mark the detected initiated call as important, by receiving a plurality of user feedback, and by determining a computation of a social distance metric between the caller and the recipient.

17. The computer system of claim 14, wherein the estimated sleep cycle is determined through a motion analysis of the recipient.

18. The computer system of claim 10, wherein the ringtone characteristic depends on a determined distance of the caller from the recipient in the recipient's social network and a determined frequency of communication between the caller and the recipient.

19. A computer program product for providing a cognitive alert control framework for a mobile device, wherein the mobile device includes an alert mechanism, the computer program product comprising:

one or more tangible computer-readable storage devices and program instructions stored on at least one of the one or more tangible storage devices, the program instructions executable by a processor, the program instructions comprising:

program instructions to detect, by a processor, a call being initiated by a caller using a first mobile device to a recipient using a second mobile device;

program instructions to determine a cognitive state of the caller;

program instructions to determine a cognitive state of the recipient;

program instructions to analyze a relationship between the caller and the recipient based on the determined cognitive state of the caller and the determined cognitive state of the recipient;

program instructions to determine a plurality of recipient feedback that is associated with the cognitive state of the recipient to identify an importance of the initiated call to the recipient, wherein the plurality of recipient feedback is based on a plurality of detected reactions by the recipient to the initiated call and a history of recipient reactions to a history of initiated calls associated with the caller;

program instructions to determine a level of alert for a ringtone characteristic associated with second mobile device based on the analyzed relationship and the plurality of recipient feedback, wherein determining the level of alert of the ringtone characteristic is selected from a group consisting of determining to increase the ringtone characteristic, determining to decrease the ringtone characteristic, determining to mute the ringtone characteristic, or determining to allow a ringtone characteristic;

program instructions to invoke the ringtone characteristic on the second mobile device based on the determined level of alert; and program instructions to learn when and how to change the level of alert for the ringtone characteristic based on the plurality of recipient feedback.

20. The computer program product of claim 19, wherein the ringtone characteristic comprises at least one of a sound characteristic, a volume, a vibration pattern, a visual alert, a number of times an alert is sounded before a voicemail application is invoked, and a threshold for determining whether to suppress the ringtone characteristic or allow the ringtone characteristic.

* * * * *